US008265076B2

(12) United States Patent
Pignatelli (10) Patent No.: US 8,265,076 B2
(45) Date of Patent: Sep. 11, 2012

(54) CENTRALIZED WIRELESS QOS ARCHITECTURE

(75) Inventor: David J. Pignatelli, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 11/335,991

(22) Filed: Jan. 20, 2006

(65) Prior Publication Data

US 2007/0171909 A1   Jul. 26, 2007

(51) Int. Cl.
*H04L 12/28* (2006.01)
*H04L 12/56* (2006.01)

(52) U.S. Cl. ............... 370/392; 370/395.21; 370/412

(58) Field of Classification Search ............ 370/395.21
See application file for complete search history.

(56) References Cited

U.S. PATENT DOCUMENTS

| | | | |
|---|---|---|---|
| 6,445,679 B1* | 9/2002 | Taniguchi et al. | 370/232 |
| 6,459,687 B1* | 10/2002 | Bourlas et al. | 370/328 |
| 7,103,350 B2* | 9/2006 | Au et al. | 455/412.2 |
| 7,212,837 B1* | 5/2007 | Calhoun et al. | 455/560 |
| 7,406,078 B2* | 7/2008 | Jeon | 370/392 |
| 2003/0169741 A1* | 9/2003 | Torsner et al. | 370/394 |
| 2003/0189935 A1* | 10/2003 | Warden et al. | 370/395.21 |
| 2004/0081093 A1* | 4/2004 | Haddock et al. | 370/230 |
| 2004/0190523 A1* | 9/2004 | Gessner et al. | 370/395.4 |
| 2004/0213198 A1* | 10/2004 | Mahmood et al. | 370/349 |
| 2005/0014509 A1* | 1/2005 | Semper et al. | 455/452.2 |
| 2005/0041576 A1* | 2/2005 | Couturier et al. | 370/229 |
| 2006/0262737 A1* | 11/2006 | Livet et al. | 370/254 |
| 2007/0116024 A1* | 5/2007 | Zhang et al. | 370/412 |
| 2007/0121542 A1* | 5/2007 | Lohr et al. | 370/329 |
| 2008/0095055 A1* | 4/2008 | Moulsley et al. | 370/234 |

OTHER PUBLICATIONS

Implementation Experiences of Bandwidth Guarantee on a Wireless LAN, Srikant Sharma, et al., ACM/SPIE Multimedia Computing and Networking (MMCN 2002), Jan. 2002.
Jyh-Cheng Chen, Armando, Caro, Anthony McAuley, Telcordia Technologies, Inc.; Shinichi Baba, Yshihiro Ohba, Toshiba America Research, Inc.; Parameswaran Ramanathan, University of Wisconsin, *A Qos Architecture for Future Wireless IP Networks*.
Daqing Gu and Jinyun Zhang, *QoS Enhancement in IEEE802.11 Wireless Local Area Networks*, MERL-A Mitsubishi Research Laboratory, TR-2003-67, Jul. 2003.

* cited by examiner

*Primary Examiner* — Gregory Sefcheck
*Assistant Examiner* — Suk Jin Kang
(74) *Attorney, Agent, or Firm* — Baker Botts L.L.P.

(57) ABSTRACT

A QoS mechanism that evaluates congestion in one or more network nodes along the wireless delivery path to optimize the processing priority at the centralized wireless network controller. The QoS mechanism determines an idealized processing time for a given client packet, within a rich set of configurable QoS attributes, for a given defined flow and then adjusts the expectation of delivering the packet based on resource congestion measurements of the wireless infrastructure.

19 Claims, 7 Drawing Sheets

CENTRALIZED WIRELESS QOS ARCHITECTURE

BACKGROUND

On the Internet and in other networks, Quality of Service (QoS) generally relates to the concept that transmission rates, error rates, and other characteristics associated with network service can be measured and, to some extent, guaranteed in advance. Typically, maintaining QoS in a fully wired network is more or less feasible given normal day-to-day occurrences. This is because it will generally be known how many end users may request information at any one time. With that information in hand, the wired network can be configured accordingly to meet that expected demand. In fact, the wired network will probably be configured for an even greater bandwidth capability to handle future demands for service.

While maintaining QoS for a wired network can be relatively straightforward, maintaining QoS for a wireless network has proven to be challenging. This is due to an unknown number of users potentially engaging the wireless network, via access points, at any given time. For example, an access point's coverage may include a conference room. If that conference room has a large amount of meeting attendees all trying to access the network at the same time; there will most likely be a degradation of QoS provided to users. This would probably occur because the network was not expecting a surge of traffic through that access point, and resources to handle that extra traffic were not in place.

One prior art method for maintaining QoS in a wireless network environment is to simply cap throughput to prescribed levels via a centralized wireless controller. A centralized wireless controller is a device that typically manages communication traffic between a wired network and a wireless network. By capping the amount of traffic that flows to the wireless network at the wireless network's capacity, the centralized wireless controller is able to maintain QoS to a degree. However, if periods of extended congestion occur, the centralized wireless controller can easily become overwhelmed. As a result, QoS may suffer if the centralized wireless controller starts to drops packets of information due to lack of resources to handle the backed-up traffic.

Yet another prior art method for maintaining wireless network QoS is to prioritize packets at specific network nodes. For example, a high-priority packet may pass through a network node. Since the packet is high-priority, the network node could perhaps be configured to hold up other packets so that the high-priority packet will be delivered to its destination in an expedient fashion. This particular approach, however, does not take into account later network nodes along the path of that high-priority packet. If one of those later nodes is heavily congested, forwarding the packet could perhaps just add to the congestion issues and even further delay the delivery of the packet to its ultimate destination.

In view of the foregoing, it may be beneficial to provide methods and systems that would allow for management of wireless network packet traffic such that a state of a network is monitored and the information on the network is applied to ensure efficient delivery of the packet traffic.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

An embodiment by way of non-limiting example discloses a method for use in a controller operating in a network environment wherein the controller processes packets received from one or more remote nodes for delivery to one or more clients. The method, used for maintaining packet delivery QoS, includes receiving a packet and identifying a destination client of the packet. Delivery path nodes to the destination client are then identified and QoS states for the destination client and delivery path nodes are acquired. An overall QoS state, for the destination client and the path to the client, is then updated based on the destination client QoS state and the delivery path nodes QoS state. A delivery preference, based on the QoS state, is then determined and the packet is stored in a buffer with delivery instructions wherein the delivery instructions include the delivery preference.

Another embodiment by way of non-limiting example discloses a method for use in a controller operating in a network environment wherein the controller processes packets received from one or more remote nodes for delivery to one or more clients. The method, used for maintaining packet delivery QoS, includes receiving a packet and identifying a destination client. Delivery path nodes to the destination client are then identified and QoS states for the destination client and delivery path nodes are acquired. An overall QoS state, for the destination client and the path to the client, is then updated based on the destination client QoS state, the delivery path nodes QoS state and at least one class criteria. A delivery preference, based on the QoS state, is then determined and the packet is stored in a buffer with delivery instructions wherein the delivery instructions includes the delivery preference.

Yet another embodiment by way of non-limiting example discloses a method for use in a controller operating in a network environment wherein the controller processes packets received from one or more remote nodes for delivery to one or more clients. The method, used for maintaining packet delivery QoS, includes receiving a packet and determining a QoS state of a destination client of the packet and delivery path nodes to the destination client. Packet delivery instructions are then determined based on the destination client and the QoS state. The packet is then stored in a buffer with the packet delivery instructions.

Exemplary Wireless Network System Architecture

Network Topology

Figure 1:
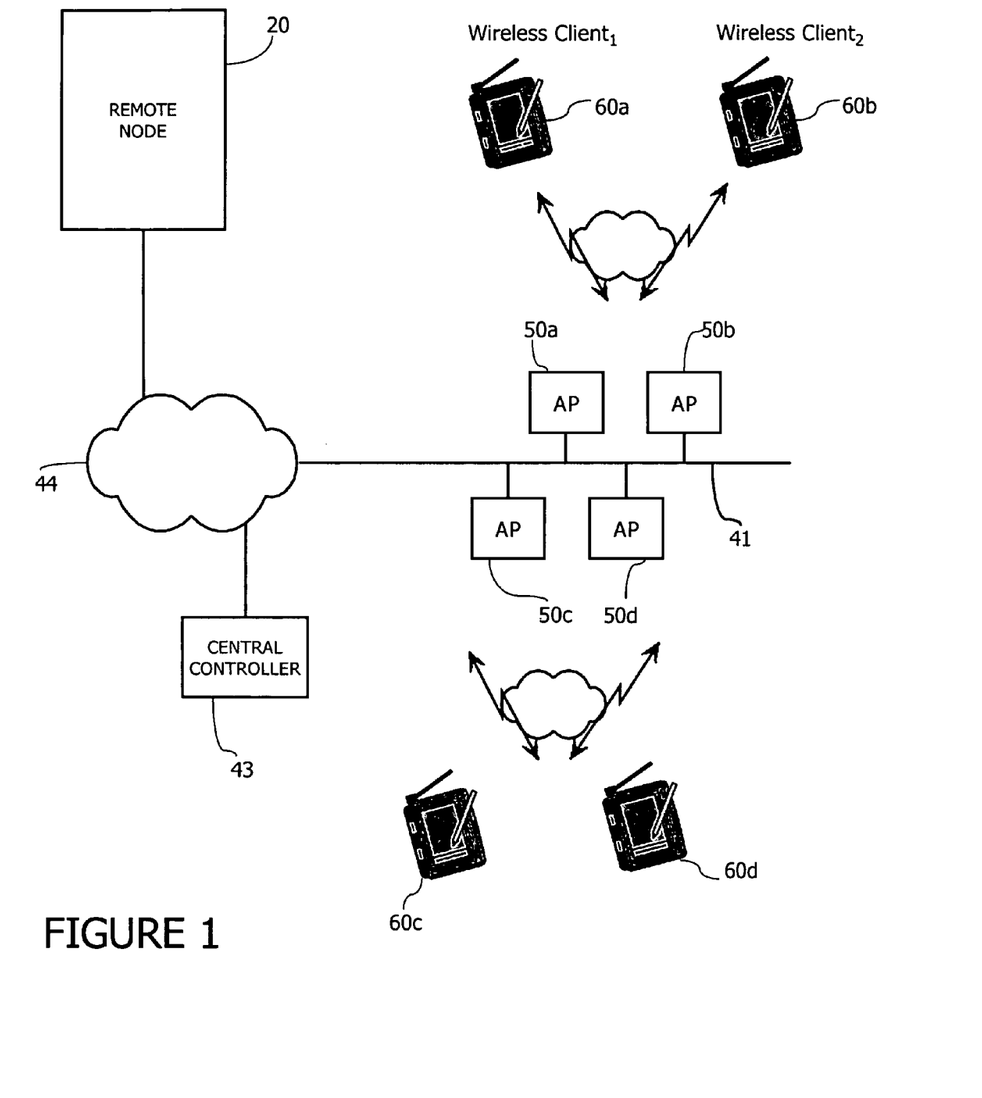
FIG. 1 is a topological diagram of a network including a wireless local area network system, in accordance with an exemplary embodiment.

A network environment according to one implementation of the claimed embodiments is shown in FIG. 1. In a specific embodiment, the system includes one or more remote nodes 20, a controller 43, a local area network (LAN) 41, wireless access points 50a, 50b, 50c, and 50d (collectively referred to as wireless access points 50) and a network 44. LAN 41 is implemented by a switch (or an array of switches) and/or other network devices, such as a bridge.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the claimed embodiments.

Figure 3:
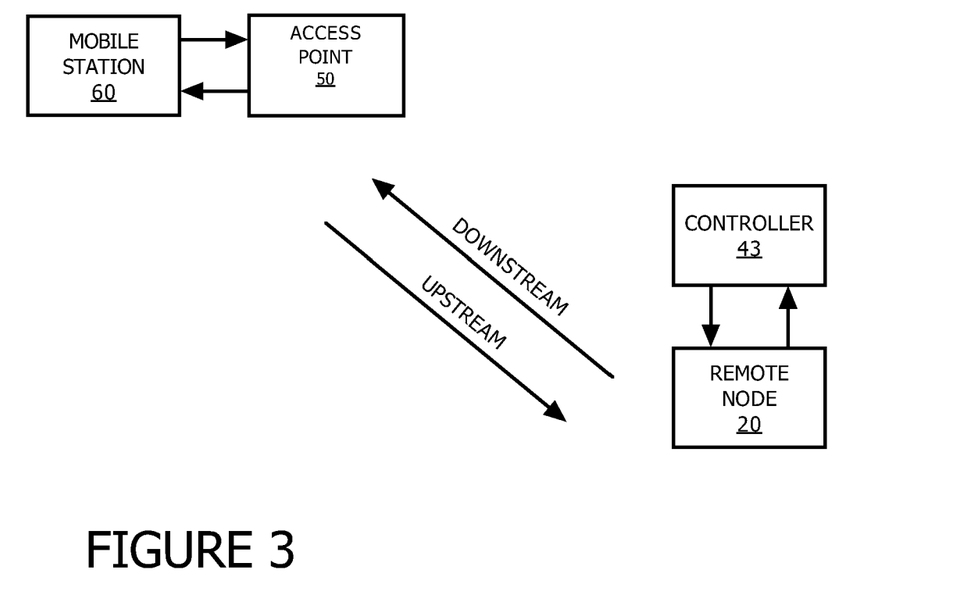
FIG. 3 is a block diagram illustrating a simplified packet traffic flow between a mobile station and a remote node, in accordance with an exemplary embodiment.

Controller 43 manages network traffic between the wireless access points 50 and remote node 20. While only one remote node is depicted in FIG. 3, it should be understood that it is merely illustrative and that controller 43 can manage traffic from multiple remote nodes and the wireless access points 50. Furthermore, as disclosed in U.S. application Ser. No. 10/407,584, controller 43 may transmit packets destined for remote nodes to wireless access points 50 using a layer 2 or layer 3 tunneling/encapsulation protocols. As depicted in FIG. 3, controller 43 is connected to a separate network from wireless access points 50, and therefore, uses layer 3 tunneling to provide packets to wireless access points. In other embodiments, however, controller 43 may be collocated with the wireless access points 50 and thus optionally use layer 2 tunneling protocols.

Access Point

Figure 2:
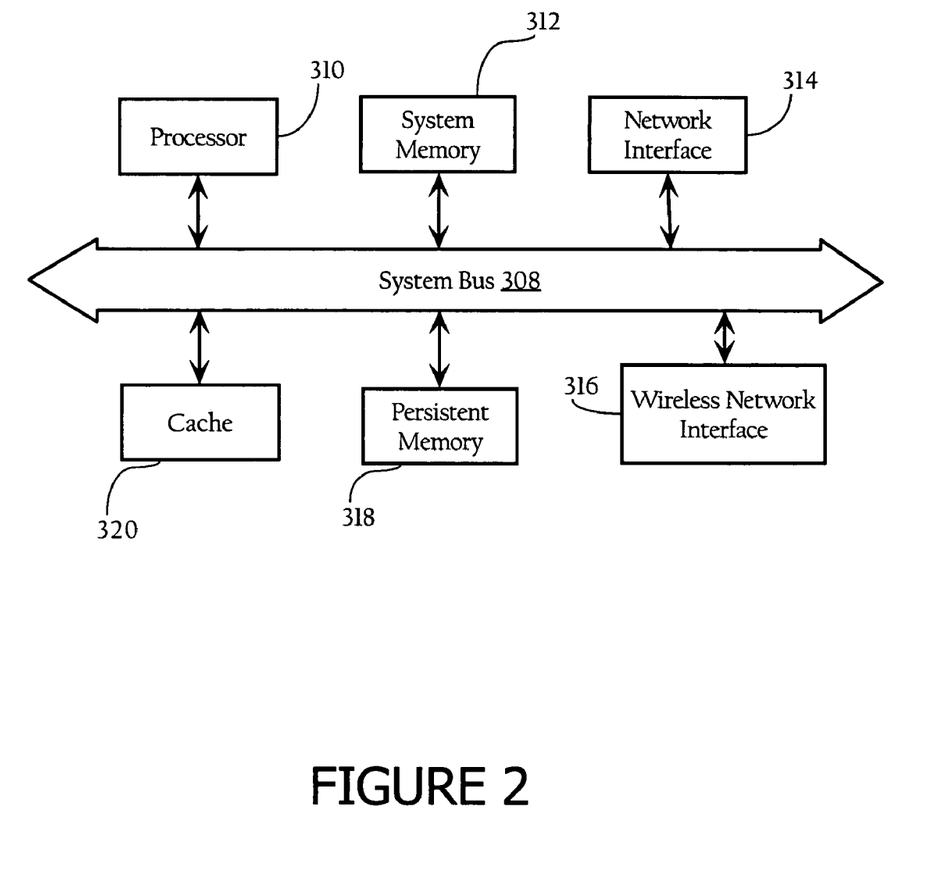
FIG. 2 is a functional block diagram illustrating the components of an access point, in accordance with an exemplary embodiment.

FIG. 2 illustrates for didactic purposes a wireless access point, which can be used to implement a wireless access point 50 of FIG. 1. In one implementation, the wireless access point comprises a processor 310, a memory 312, a network interface 314 (e.g., an Ethernet or 802.3 interface) for communication with a LAN, a wireless network interface 316 (e.g., an IEEE 802.11 WLAN interface) for wireless communication with one or more wireless clients 60, a persistent memory 318, a cache 320 for storing connection state information, and a system bus 308 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310.

Referring back to FIG. 1, controller 43 manages packet traffic for both upstream and downstream traffic between remote node 20 and the wireless clients 60 connected to access points 50. The packet flow is further detailed via FIG. 3 which is a block diagram illustrating a simplified packet traffic flow between a mobile station 60 and a remote node 20, in accordance with an exemplary embodiment. As used in the context of this disclosure, upstream traffic refers to packet traffic being sent from mobile stations 60 via the access points 50 and to one or more remote nodes, such as remote node 20. Similarly, downstream refers to traffic originating from a remote node to access points 50 and mobile stations 60. Controller 43 manages traffic for both upstream and downstream traffic. However, downstream traffic is typically seven to ten times that of upstream traffic. In addition, the QoS mechanisms implemented by controller 43 typically have a greater effect on downstream packet flows based on its position in the transmission path. As a result, QoS issues are more likely to be encountered in connection with downstream traffic. The balance of this disclosure primarily details packet delivery QoS for downstream traffic. However, the claimed embodiments can also be applied to upstream traffic such as, for example, policing a client to stay within negotiated traffic throughput limits.

Aspects of the claimed embodiments are directed to systems, apparatuses and methods for maintaining packet delivery QoS over a wireless network. This is achieved by assessing current network traffic for delivery path nodes that a packet will travel through, assessing an operating state of the packet's destination client and, optionally, a user class related to the packet. After taking these variables into account, a packet is assigned a delivery preference that influences when that packet will be read from a transmit buffer or queue and ultimately transmitted. Typically, the delivery preference is embodied in a time delay value.

Figure 4:
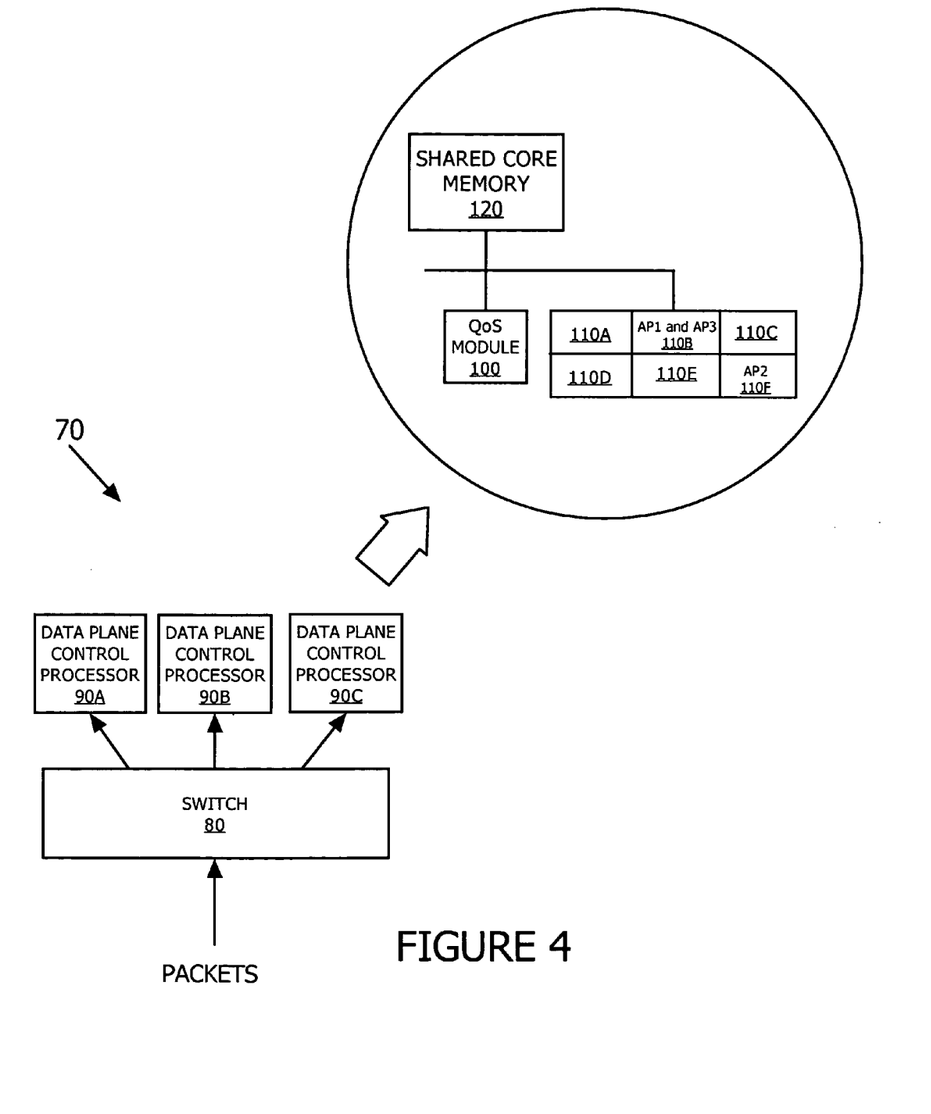
FIG. 4 is a block diagram illustrating certain functional components of a wireless controller, in accordance with an exemplary embodiment.

Analysis of the incoming packets will typically take place within a controller 70, such as the one partly shown in FIG. 4 which is a block diagram illustrating a portion of a wireless controller 70, in accordance with an exemplary embodiment. Included in controller 70 is a switch 80, multiple data plane and control processors 90a, 90b, 90c (collectively, 90). As FIG. 4 illustrates, each data plane and processor 90 includes multiple processor cores 110a-f, a QoS module 100, and shared memory 120. In one implementation, one processor core (e.g., 110a, for example) is a control processor executing control plane functionality for one or more wireless access points 50. For example, processor core 110a can implement the control plane functionality disclosed in U.S. application Ser. No. 10/407,584, such as processing physical and MAC layer information (e.g., authentication/association requests, etc.) to dynamically configure WLANs implemented by the wireless access points 50. In one implementation, the remaining cores 110b-f of data plane and control processor 90 each execute data plane functionality. For example, each core 110b-f processes packets, implementing various required functions, such as bridging, intrusion detection, encryption, and tunneling. As discussed in more detail below, QoS module 100 operates to schedule processing of packets by the data plane cores. Shared core memory 120, in one implementation, buffers received packets and includes various queues (or other scheduling data structures) used by the packet scheduling and QoS functionality described herein.

In operation, switch 80 receives downstream packets transmitted to wireless clients. After respective associations, the IP addresses of the wireless clients reside in the switch forwarding tables, allowing switch 80 to direct packets to the correct data plane and control processor 90. Switch 80 identifies the respective destination MAC addresses of the packets to ascertain to which wireless access points 50 the packets should be forwarded. Each wireless access point 50 in a wireless network associated with controller 70 is assigned to a data plane and control processor (90A, 90B or 90C), and within a data plane and control processor 90 a respective data plane core 110b-f. In one implementation, each data plane core 110b-f can support up to 10 wireless access points 50. After switch 80 ascertains the appropriate access point (and thus data plane and control processor 90), the packet is read into shared memory 120. As discussed in more detail below, QoS module 100 assigns a delivery preference to the packet. The delivery preference potentially enables the packet to be delivered in a manner that maintains overall QoS.

As discussed above, each data plane and control processor 90 is divided into individual CPU's or cores such as cores 110. In one implementation, data plane and control processor 90 is an application-specific integrated circuit (ASIC); however, data plane and control processor 90 can be implemented in any suitable processing architecture or circuit. Each data plane core 110b-f is assigned one or more access points. The cores 110b-f perform further processing on the packets after the delivery preference is calculated by the QoS module 100. One of the main functions of cores 110b-f is to bridge or convert a packet from one network format to another. In the downstream direction, another function of the cores 110b-f is to tunnel the packets to the appropriate access point 50 for forwarding to destination wireless clients. Typically, memory 120 is shared with all cores 110; however in other implementations, memory 120 can be divided and dedicated to the respective cores 110. It should additionally be noted that it is merely illustrative that three data plane and control processors 90 each including six cores 110 are depicted in FIG. 4. The selection of how many processors and how many cores per processor is a design choice dependent on a variety of factors. As such, the claimed embodiments can be utilized with practically any number combination of processors and associated cores.

Figure 5:
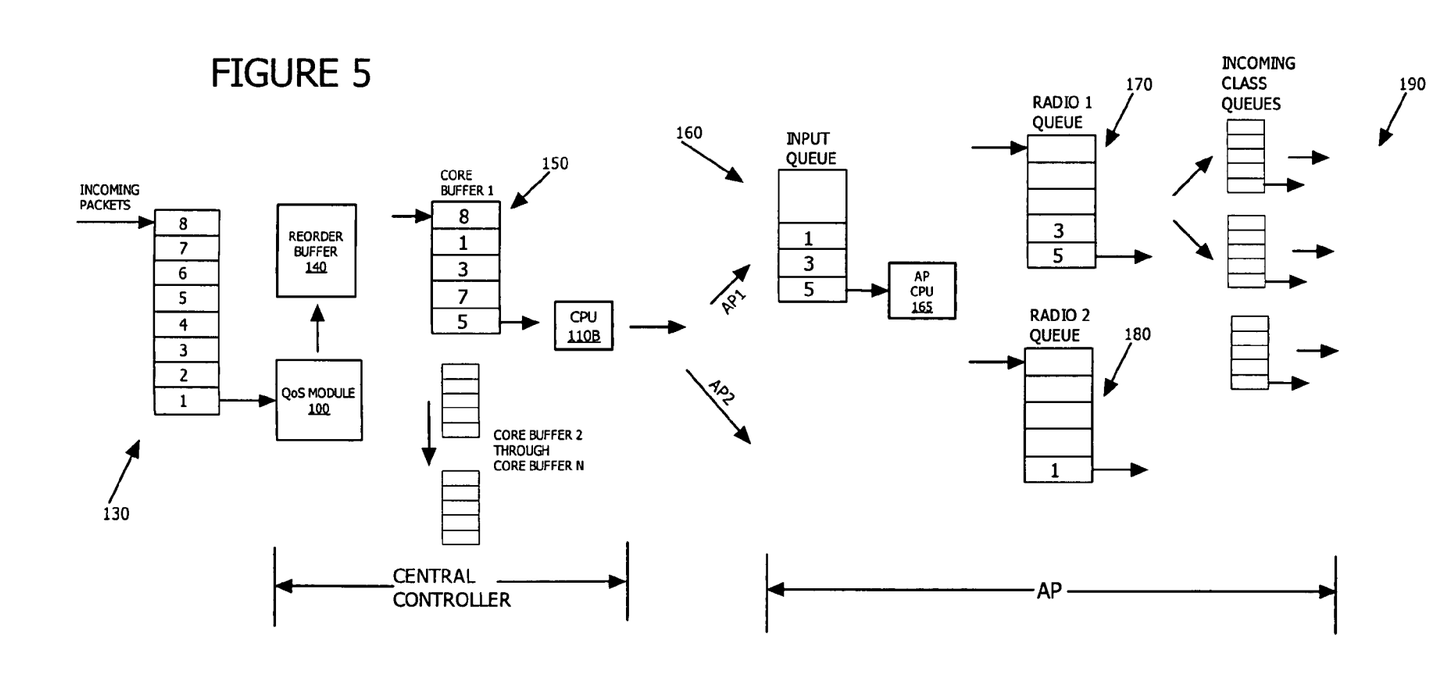
FIG. 5 is a block diagram illustrating a downstream flow of packets through the controller and a wireless access point, in accordance with an exemplary embodiment.

An exemplary downstream flow of packets through a controller (such as the controller 70 of FIG. 4) and an access point will now be presented Via FIG. 5. Initially, incoming downstream packets 1-8 are read into memory, and pointers to the packets are placed on a receive queue 130. QoS module 100 processes packets in the receive queue 130 and determines delivery preference values for the packets. As previously stated, the QoS module 100 examines one or more attributes of the delivery path nodes and destination client for each packet and decides on a delivery preference to efficiently deliver packets to their destination clients. After computing a delivery preference for a packet, QoS module 100 writes the corresponding packet pointer to a reorder buffer 140. In one implementation, the reorder buffer 140 stores the packet pointer in association with the corresponding preference value. A separate scheduling process reads packet pointers from the reorder buffer 140, and writes them to a core buffer 150 corresponding to the appropriate access point 50. This separate scheduling process reads packet pointers from the reorder buffer 140 based on the preference values. In one implementation, the preference values are time values indicating when the packets should be transmitted. Accordingly, the scheduling process scans the reorder buffer for the lowest preference value or, in another implementation, the preference value that matches the current time. In one implementation, any packets that are not to be delivered right away to their destination client, as decided by the QoS module 110, are stored in reorder buffer 140 until it is time for them to be delivered. Other packets with no delay or very minimal delay pass through buffer 140 quickly and are written to a core buffer associated to a particular core (such as core 110b, as shown). As previously indicated, access points are assigned to cores and this pairing influences through which data structures and processing paths the packets flow.

In the example flow of FIG. 5, packets 1, 3, 7, 5 and 8 are destined for either access point #1 or access point #2 which will subsequently become evident. As FIG. 5 illustrates, core buffer 150 also indicates that the packets have been re-arranged for delivery and the delivery order is different from the order in which they were initially received at the controller 43. That is, of the five packets that are forwarded for delivery, the packets are now set to be delivered in the order of packet #5, #7, #3, #1 and then #8. In one implementation, data plane core 110b reads packets from the core buffer and writes them to a transmit queue (not shown) for delivery to the appropriate access point. In one implementation, the packets are read from the transmit queue and traverse the switch 80 to reach their destination access points.

As FIG. 5 shows, of packets #5, #7, #3, #1 and #8, only packets #1, #3 and #5 are sent to access point #1. Packets #7 and #8 are sent to access point #2 and delivery of those two packets will not be addressed for the balance of this example. Referring back to access point #1, packets #1, #3 and #5 are placed into an input queue 160 and each packet is further processed by access point CPU 165. After CPU 165, packets #5 and #3 are placed into radio 1 queue 170 and packet #1 is placed in radio 2 queue 180. While FIG. 5 illustrates a dual-radio access point, the present invention can be implemented in connection with single-mode radios and multi-mode radios. Typically, packets will be delivered to their destination client after passing through an access point's radio queue. However, delivery of packets may be prioritized via a classification such as an access class, a within user class, a flow class or other classes that could potentially be useful. If delivery class is utilized, various incoming class queues 190 can further be utilized to achieve preferential class delivery of packets. It should be noted, though, that access class prioritization of packets may take place at the QoS module 100. In one implementation, the QoS module 100 accesses a QoS database, using the IP or MAC address of the wireless client to determine the relative priority of the packets. In one implementation, the control core 110a populates various relevant QoS parameters and variables (e.g., client identifiers, flow identifiers, etc.) during processing of wireless management frames, such as association requests, and ADDTS frames according to the 802.11e protocol. In addition, flows can be identified based on attribute tuples including one or more of the following attributes: 1) source addresses (MAC and/or IP); 2) destination address (MAC and/or IP); 3) port numbers; 4) flow or stream identifiers; and 5) protocol identifiers.

Figure 6:
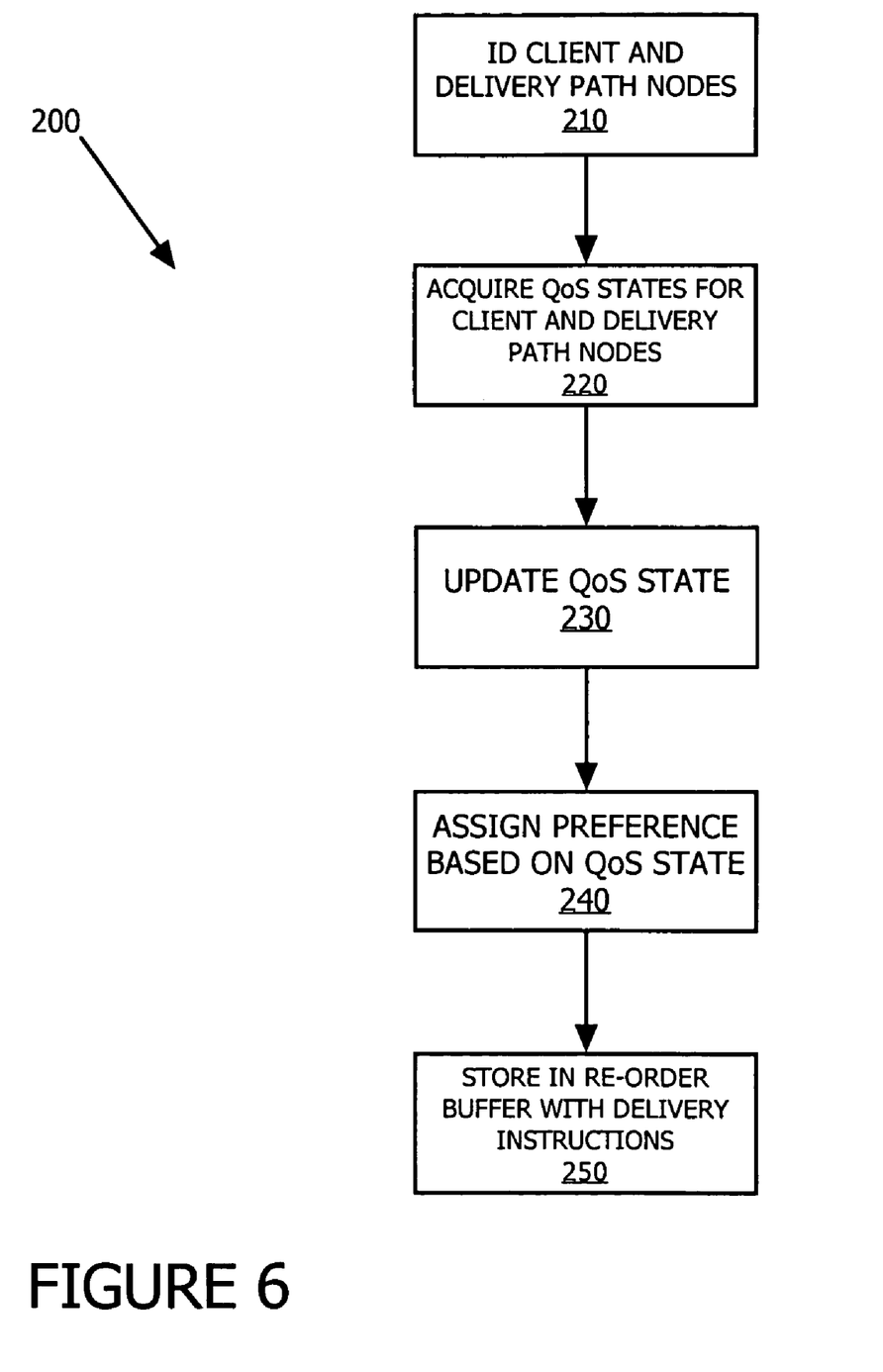
FIG. 6 is a flowchart illustrating a method directed to packet delivery QoS, in accordance with an exemplary embodiment.

The operation of the QoS module 100, according to one possible implementation of the invention, will now be detailed via FIG. 6 which shows a flowchart illustrating a method 200 for maintaining packet delivery QoS. In general terms, the QoS module 100, by computing a preference value, essentially sorts input packets destined for wireless transmission into an order that best meets the QoS service targets for each of the core processing pipelines. As previously indicated, a delivery preference is calculated for each packet and the calculations are based on examination of the relevant state of one or more nodes in the path the packet will traverse to its destination client. In one implementation, QoS module 100 also examines QoS parameters or variables associated with the destination client itself, such as QoS parameters associated with the flow or stream of which the packet is a part. In one implementation, QoS module 100 assesses the congestion of the controller resources, and the delivery path nodes, together with the client QoS state variables to compute the deliver path preference and thus the order in which packets are processed. Typically, the delivery preference value will take the form of a time delay. As discussed above, the packet is delivered when the time delay expires. The time delay itself can be computed relative to a real-time value or relative to the values of a hardware-based counter. Additionally, a user or access class associated with the packet could be utilized in calculating the delivery preference. After the delivery preference is calculated, the packet is placed into a buffer (for example, reorder buffer 140 of FIG. 5) and then delivered to its destination client when it is time to do so.

In one implementation, delivery preference values can be computed based on one or more of the following QoS metrics: 1) Peak Packets-Per-Second Rate (Peak_PPS_Rate), 2) Average Packets-Per-Second Rate (Average_PPS_Rate), 3) Peak Bits-Per-Second Rate (Peak_BPS_Rate), 4) Average Bits-Per-Second Rate (Average_BPS_Rate), 5) Delay (Latency), and 6) Jitter. In addition, the factors used to compute delivery preference values can vary across wireless clients, and can be configurable by a network administrator. To maintain the Peak_Rate quality metrics, the controller 43 monitors the time between packets and the current packet size to make a determination in absolute bits per second. In one implementation, a packet can be delayed a proportioned amount to avoid exceeding an established limit. To maintain an Average_Rate quality metric, the controller 43 computes a running average of the absolute bits per second measurements and advances the processing of a packet if the average rate is too low. The Delay quality metric can be used to specify low latency processing for network application flows, such as VoIP over WLAN. The Delay metric is qualified by comparing one time stamp taken when a packet is received at an interface of switch 80 to another time stamp taken when the packet is submitted to processing. The queuing delay (preference value) can be used to assign preference to low latency flows. The Jitter quality metric can be used to stabilize the apparent inter arrival interval of packets at the wireless client. Jitter in the wired network infrastructure puts a strain on the limited buffering capacity of battery powered clients. The Jitter quality metric performs a low pass filter on the inter-arrival times of these packets from the wired network. Then the unfiltered inter-arrival time is compared to the filtered time to determine a jitter error. This error is used to select a compensating transmit time, and this selects the time the packet is processed by a data plane core 110b-f. Like the Delay quality metric, the ability to compensate Jitter in an oversubscribed environment may be limited.

Each QoS service quality specification provides scaling coefficients so that the relative importance of the measured quality metrics in determining the disposition packets governed by said specification can be arbitrarily specified. The ultimate control result is to determine when, relative to absolute, real time, and relative to all other received packets being processed under the same QoS domain, the packet should be sent to a data plane core 110b-f for processing. As discussed above, this time shifting is accomplished by the Reorder Buffer 140. The Reorder Buffer 140 allows a packet to be delayed for anytime between 0 and a reorder time extent limit (a configurable parameter). All packets receive a nominally short amount of delay, packets that need to be advanced are given virtually no delay, and packets in misbehaving flows are held off until established rate limits are met. When packet flows exceed thresholds (e.g., high average PPS and average BPS values), a received packet may be dropped entirely.

As FIG. 6 provides, when the QoS module 100 processes a packet from receive queue 130, the QoS module 100 identifies the packet's destination client and delivery path nodes (such as an access point 50, and optionally other intermediate nodes in the path) to that destination client (210). Next, module 100 acquires QoS states and variables (220), for both the destination client and the delivery path nodes, and updates an overall QoS state for delivering the packet (230). Typically, a QoS state for delivery path nodes are based on percentage utilization. For example, given that controller 43 can be configured with knowledge of the maximum throughput or capacity of the wireless access points 50, and that the controller 43 meters out packets to the wireless access points 50, it is able to determine the percentage bandwidth or throughput capacity utilized a given access point. In addition, QoS states for a client can be based on packet rate, byte rate, delay and/or jitter. For example, relevant client QoS states can be based on the flow parameters requested by a wireless client using the IEEE 802.11e protocol. Next, QoS module 110 computes a delivery preference (240) based on the overall QoS state and that preference is typically embodied as a time delay. Finally, the module forwards the packet with delivery instructions for storage (250) in the reorder buffer 140. The delivery instructions include the destination device (e.g., a wireless access point), data plane core identifier, and the computed delivery preference. As discussed above, a separate scheduling process reads the packets from the re-order buffer 140 based on the computed delivery preference values.

Figure 7:
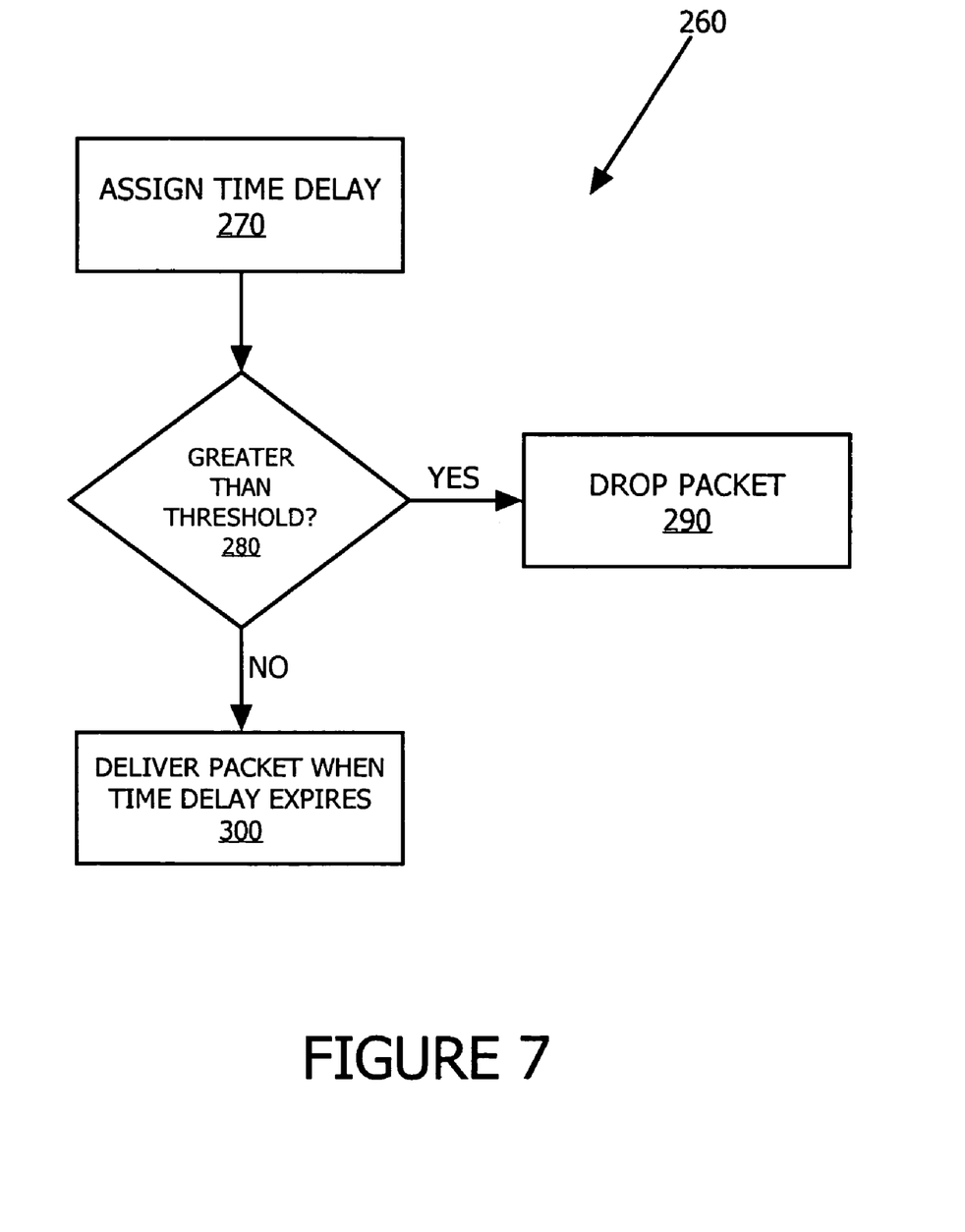
FIG. 7 is a flowchart illustrating a method for discarding packets in connection with a packet delivery QoS mechanism, in accordance with an exemplary embodiment.

Prior to writing a packet into the reorder buffer 140, it may be desirable to compare the delivery preference or delay value to a threshold value to determine whether the packet should be dropped. For example, a packet corresponding to a flow with certain latency requirements may need to be delivered within a certain timeframe; however, the QoS module 100 may have assigned a time delay that would prevent the packet from being delivered within a required time frame. This situation may occur for a number of reasons such as the packet flow being assigned a low priority user or access class, and/or a congested network path. Accordingly, in one implementation, controller 43 drops packets that cannot be delivered within a required time frame. This process is detailed via FIG. 7 which shows a flowchart illustrating a method 260 for discarding packets, in accordance with an exemplary embodiment. First, as discussed above, QoS module 100 assigns a time delay (270) to a packet. Next, QoS module 100 compares the time delay to a threshold (280) and the packet is dropped if the time delay is greater than the threshold (290). Otherwise, the packet is delivered when the time delay expires. In one implementation, the threshold may be a uniform threshold, a network application specific threshold, a client-specific threshold, or based on one or more QoS parameters (if any) corresponding to the flow of which the packet is a part.

By utilizing the claimed embodiments, a number of QoS features can be realized. Firstly, QoS for a wireless network is facilitated since a central node schedules packets for processing, taking into account the entire network path a packet would traverse to its destination client. Secondly, valuable processing resources are not wasted on packets that can not be delivered at a correct time. As a result, QoS levels remain more consistent. In addition, this minimizes the impact to entire wireless network when only small localized regions are congested. Further this QoS implementation provides a high degree of flexibility and granularity with per flow, per client QoS assignment capabilities. Additionally, packets can now be given priority processing based on a user or access class over a broader segment of the transmission path between end points. Still further, certain disclosed embodiments provide scheduled delivery of line rate traffic to packet forwarding engines. While the software is unable to process at peak line rate, to accommodate normal network bursts, the QoS module 100 classifies and queues packets at a line rate. In this way, highly valued QoS traffic can be preserved (not dropped) in case of possible oversubscription of packet capacity. This allows a fairly aggressive number of wireless access points 50 to be serviced by a single data plane and control processor, thereby decreasing costs but at the same time increasing service quality.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a controller operating in a network environment wherein the controller processes packets received from one or more remote nodes for delivery to one or more clients, a method for maintaining packet delivery Quality of Service (QoS), the method comprising:
   receiving a packet that identifies a destination client of the packet;
   identifying one or more delivery path nodes to the destination client;
   acquiring a QoS state associated with at least one of the one or more delivery path nodes, wherein the QoS state characterizes utilization of available transmission resources of a corresponding delivery path node, and wherein acquiring the QoS state associated with the at least one of the one or more delivery path nodes is based on a percent utilization corresponding to the one or more delivery path nodes;
   determining a transmit delay based on the acquired QoS state, wherein said transmit delay comprises a time delay that varies based at least in part on the acquired QoS state;
   storing the packet in a buffer with delivery instructions wherein the delivery instructions include the transmit delay; and
   passing, when the transmit delay expires, processing of the packet to a data processing engine wherein the data processing engine is operative to forward the packet onto the transmission media to the destination client.

2. The method as recited in claim 1 further comprising delivering the packet to the destination client based on the delivery instructions.

3. The method as recited in claim 1 wherein the packet is dropped if the time delay is greater than a threshold.

4. The method as recited in claim 3 wherein the threshold is based upon a QoS parameter.

5. A controller comprising:
   a network interface;
   one or more processors;
   a memory; and
   a packet scheduling application, stored in the memory, including instructions operable to cause the one or more processors to:
   receive a packet that identifies a destination client of the packet;
   identify one or more delivery path nodes to the destination client;
   acquire a QoS state associated with at least one of the one or more delivery path nodes, wherein the QoS state characterizes utilization of available transmission resources of a corresponding delivery path node, and wherein acquiring the QoS state associated with the at least one of the one or more delivery path nodes is based on a percent utilization corresponding to the one or more delivery path nodes;
   determine a transmit delay based on the acquired QoS state, wherein said transmit delay comprises a time delay that varies based at least in part on the acquired QoS state;
   store the packet in a buffer with delivery instructions wherein the delivery instructions include the transmit delay; and
   pass, when the transmit delay expires, processing of the packet to a data processing engine wherein the data processing engine is operative to forward the packet onto the transmission media to the destination client.

6. The controller as recited in claim 5 wherein the packet scheduling application further comprises instructions operable to cause the one or more processors to deliver the packet to the destination client based on the delivery instructions.

7. The controller as recited in claim 6 wherein the packet scheduling application further comprises instructions operable to cause the one or more processors to:
   forward the packet from the data processing engine to the destination client.

8. The controller as recited in claim 7 wherein the packet scheduling application further comprises instructions operable to cause the one or more processors to drop the packet if the time delay is greater than a threshold.

9. The controller as recited in claim 8 wherein the threshold is based upon a QoS parameter.

10. A controller comprising:
    means for receiving a packet that identifies a destination client of the packet;
    means for identifying one or more delivery path nodes to the destination client;
    means for acquiring a QoS state associated with at least one of the one or more delivery path nodes, wherein the QoS state characterizes utilization of available transmission resources of a corresponding delivery path node, and wherein acquiring the QoS state associated with the at least one of the one or more delivery path nodes is based on a percent utilization corresponding to the one or more delivery path nodes;
    means for determining a transmit delay based on the acquired QoS state, wherein said transmit delay comprises a time delay that varies based at least in part on the acquired QoS state;
    means for storing the packet in a buffer with delivery instructions wherein the delivery instructions include the transmit delay; and
    means for passing, when the transmit delay expires, processing of the packet to a data processing engine wherein the data processing engine is operative to forward the packet onto the transmission media to the destination client.

11. In a controller operating in a network environment wherein the controller processes packets received from one or more remote nodes for delivery to one or more clients, a method for maintaining packet delivery QoS comprising:
    receiving a packet identifying a destination client;

identifying one or more delivery path nodes to the destination client;

acquiring a destination client QoS state and a delivery path nodes QoS state, wherein the delivery path nodes QoS state characterizes utilization of available transmission resources of the one or more delivery path nodes to the destination client, and wherein acquiring the delivery path nodes QoS state is based on a percent utilization of the delivery path nodes;

updating a QoS state based on the destination client QoS state and the delivery path nodes QoS state;

determining a transmit delay based on the QoS state, wherein said transmit delay comprises a time delay that varies based at least in part on the acquired QoS state;

storing the packet in a buffer with delivery instructions wherein the delivery instructions include the transmit delay; and passing, when the transmit delay expires, processing of the packet to a data processing engine wherein the data processing engine is operative to forward the packet onto the transmission media to the destination client.

12. The method as recited in claim 11 further comprising delivering the packet to the destination client based on the delivery instructions.

13. The method as recited in claim 11 wherein the packet is dropped if the time delay is greater than a threshold.

14. The method as recited in claim 11 wherein acquiring the destination client QoS state is based on packet rates, byte rates and jitter.

15. A controller comprising:
a network interface;
one or more processors;
a memory; and
a packet scheduling application, stored in the memory, including instructions operable to cause the one or more processors to:
receive a packet identifying a destination client;
identify one or more delivery path nodes to the destination client;
acquire a destination client QoS state and a delivery path nodes QoS state, wherein the delivery path nodes QoS state characterizes utilization of available transmission resources of the one or more delivery path nodes to the destination client, and wherein acquiring the delivery path nodes QoS state is based on a percent utilization of the delivery path nodes;
update a QoS state based on the destination client QoS state and the delivery path nodes QoS state;
determine a transmit delay based on the QoS state, wherein said transmit delay comprises a time delay that varies based at least in part on the acquired QoS state;
store the packet in a buffer with delivery instructions wherein the delivery instructions include the transmit delay; and
pass, when the transmit delay expires, processing of the packet to a data processing engine wherein the data processing engine is operative to forward the packet onto the transmission media to the destination client.

16. The controller as recited in claim 15 wherein the packet scheduling application further comprises instructions operable to cause the one or more processors to deliver the packet to the destination client based on the delivery instructions.

17. The controller as recited in claim 15 wherein the wireless network interface driver application further comprises instructions operable to cause the one or more processors to drop the packet if the time delay is greater than a threshold.

18. The controller as recited in claim 15 wherein acquiring the destination client QoS state is based on packet rates, byte rates and jitter.

19. A controller comprising:
means for receiving a packet identifying a destination client;
means for identifying one or more delivery path nodes to the destination client;
means for acquiring a destination client QoS state and a delivery path nodes QoS state, wherein the delivery path nodes QoS state characterizes utilization of available transmission resources of the one or more delivery path nodes to the destination client, and wherein acquiring the delivery path nodes QoS state is based on a percent utilization of the delivery path nodes;
means for updating a QoS state based on the destination client QoS state and the delivery path nodes QoS state;
means for determining a transmit delay based on the QoS state, wherein said transmit delay comprises a time delay that varies based at least in part on the acquired QoS state;
means for storing the packet in a buffer with delivery instructions wherein the delivery instructions include the transmit delay; and
means for passing, when the transmit delay expires, processing of the packet to a data processing engine wherein the data processing engine is operative to forward the packet onto the transmission media to the destination client.

* * * * *